US005767478A

United States Patent [19]

Walters

[11] Patent Number: 5,767,478

[45] Date of Patent: Jun. 16, 1998

[54] ELECTRODE FOR PLASMA ARC TORCH

[75] Inventor: Jeffrey K. Walters, Bradenton, Fla.

[73] Assignee: American Torch Tip Company, Bradenton, Fla.

[21] Appl. No.: 911,004

[22] Filed: Aug. 14, 1997

Related U.S. Application Data

[63] Continuation-in-part of Ser. No. 779,006, Jan. 2, 1997, Pat. No. 5,676,864.

[51] Int. Cl.$^6$ ........ B23K 10/00

[52] U.S. Cl. ........ 219/121.52; 219/121.48; 219/75; 219/119

[58] Field of Search ........ 219/121.52, 118, 219/119, 75, 74, 121.48, 121.39, 121.45; 313/231.21, 231.31

[56] References Cited

U.S. PATENT DOCUMENTS

| | | |
|---|---|---|
| 3,198,932 | 8/1965 | Weatherly . |
| 3,930,139 | 12/1975 | Bykhovsky et al. . |
| 5,023,425 | 6/1991 | Severance, Jr. . |
| 5,097,111 | 3/1992 | Severance, Jr. . |
| 5,451,739 | 9/1995 | Nemchinsky et al. . |

*Primary Examiner*—Mark H. Paschall

*Attorney, Agent, or Firm*—Sughrue, Mion, Zinn, Macpeak & Seas, PLLC

[57] ABSTRACT

An electrode for supporting an arc in a plasma arc torch. The electrode includes a metallic holder having a front end, and a cavity in the front end, the cavity having an enlarged outer end portion. An insert assembly is mounted in the cavity and includes an emissive insert composed of a metallic material having a relatively low work function, a sleeve which substantially surrounds the emissive insert so as to separate the emissive insert from contact with the holder at least at the front end. The sleeve is composed of a metal which is selected from the group consisting of silver, gold, platinum, rhodium, iridium, palladium, nickel, and alloys thereof. The insert assembly further includes an aluminum face plate disposed in the enlarged outer end portion of the cavity and which is exposed at the front end of the metallic holder so as to surround a front portion of the sleeve. Alternatively, the aluminum face plate is eliminated and the front end of the metallic holder directly contacts the emissive insert. The overlay portion of the metallic holder between the front face thereof and the sleeve has a predetermined thickness.

5 Claims, 6 Drawing Sheets

ELECTRODE FOR PLASMA ARC TORCH

CROSS REFERENCE TO RELATED APPLICATIONS

This is a Continuation-in-part of application Ser. No. 08/779,006, filed Jan. 2, 1997, now U.S. Pat. No. 5,676,864.

BACKGROUND OF THE INVENTION

The present invention relates to a plasma arc torch and, more particularly, to a novel electrode for use in a plasma arc torch and having an improved service life.

Commonly used for working of metals, plasma arc torches are used for cutting, welding, surface treatment, melting and annealing. These torches include an electrode that supports an arc that extends from the electrode to the workpiece in the transferred arc mode of operation. It is also conventional to surround the arc with a swirling vortex of gas, and in some torch designs, it is conventional to envelope the gas and arc with a swirling jet of water.

The electrode used in a conventional torch of the type described typically comprises an elongate tubular member composed of a material of high thermal conductivity, such as copper or a copper alloy. The forward or discharge end of the tubular electrode includes a bottom end wall having an emissive insert embedded therein which supports the arc. The insert is composed of a material which has a relatively low work function, which is defined in the art as the potential step, measured in electron volts, which permits thermionic emission from the surface of a metal at a given temperature. In view of its low work function, the insert is thus capable of readily emitting electrons when an electrical potential is applied thereto, and commonly used insert materials include hafnium, zirconium, and tungsten.

One of the major problems connected with the torches referred to above is the shortness of service life of their electrodes, especially when the torches are used with an oxidizing arc gas, such as oxygen or air. In those torches, the gas appears to rapidly oxidize the copper, and as the copper oxidizes, its work function fails. This results in the oxidized copper which surrounds the insert to begin to support the arc in preference to the insert. After this occurs, the copper oxide and supporting copper melt, thereby causing early destruction and/or failure of the electrode.

U.S. Pat. No. 5,023,425 (Severance, Jr.) which issued on Jun. 11, 1991, and which is incorporated herein by reference, discloses an electrode for a plasma arc torch wherein the electrode includes a copper holder having a lower end which mounts an emissive insert which acts as the cathode terminal for the arc during operation. A sleeve of silver is positioned to surround the insert and form an annular ring on the lower end surface of the holder to surround the exposed end face of the emissive insert. The annular ring serves to prevent arcing from the copper holder, and so that the arc is maintained on the insert. However, while the silver sleeve of the '425 patent was intended to prolong the life of the copper holder, in practice, this electrode suffers from problems in that the silver tends to erode too fast.

U.S. Pat. No. 3,930,139 (Bykhovsky et al.) which issued on Dec. 30, 1975, and which is incorporated herein by reference, also discloses an electrode for plasma arc working of materials. In the '139 patent, the holder is again formed from copper or copper alloys and an active insert is fastened to the end face of the holder and is in thermal and electrical contact with the holder through a metal distance piece disposed between the active insert and the holder and over the entire contact surface area. The metal distance piece is formed from aluminum or aluminum alloys and the active insert is formed from hafnium or from hafnium with yttrium and neodymium oxides as dopants therein taken separately or in combination. However, while the aluminum sleeve surrounding the active insert in the '139 patent serves to protect the copper holder surrounding the active insert, the aluminum distance piece or sleeve offers no advantages over the silver sleeve of the '425 patent to Severance, Jr.

SUMMARY OF THE INVENTION

It is an object of the present invention to provide an electrode adapted for use in a plasma arc torch of the type described, and which is capable of providing significantly improved service life when the torch is used in an oxidizing atmosphere.

In particular, the present invention provides an electrode for supporting an arc in a plasma arc torch, the electrode comprising: a metallic holder having a front end, and a cavity in the front end, the cavity having an enlarged outer end portion; and an insert assembly mounted in the cavity and comprising an emissive insert composed of a metallic material having a relatively low work function, a sleeve which substantially surrounds the emissive insert so as to separate the emissive insert from contact with the holder at least at the front end, the sleeve being composed of a metal which is selected from the group consisting of silver, gold, platinum, rhodium, iridium, palladium, nickel, and alloys thereof, and an aluminum face plate disposed in the enlarged outer end portion of the cavity and which is exposed at the front end of the metallic holder so as to surround a front portion of the sleeve.

The holder comprises a metal selected from the group consisting of copper and copper alloys, whereas the emissive insert comprises a metal selected from the group consisting of hafnium, zirconium, tungsten, and alloys thereof.

The enlarged outer end portion of the cavity is annular in shape, and the aluminum face plate comprises an annular disc which fits into the annular outer end portion of the holder. The annular disc has an outer diameter of about 0.250 inches and a thickness of about 0.020 inches.

An end of the sleeve nearest to the front end of the holder abruptly necks down and then gradually tapers toward the front end of the holder such that a thin annular surface is formed. The distance between the inner diameter and the outer diameter of the thin annular surface is in a range of between 0.004 inches and 0.005 inches.

The holder is generally tubular and has a transverse end wall which defines an outer front face. The emissive insert has an outer end face which lies in the plane of the outer front face of the holder, the sleeve has the thin outer annular surface which lies in the plane of the outer front face of the holder and surrounds the outer end face of the emissive insert, and the aluminum face plate has an outer annular surface which lies in the plane of the outer front face of the holder and which surrounds the outer annular surface of the sleeve.

According to an alternative embodiment, the aluminum face plate is eliminated and the front end of the metallic holder directly contacts the emissive insert, such that none of the silver sleeve is exposed at the front face of the metallic holder. The overlay portion of the metallic holder between the front face thereof and the silver sleeve has a predetermined thickness. The predetermined thickness is preferably, but not necessarily, 0.010 inches.

BRIEF DESCRIPTION OF THE DRAWINGS

Some of the advantages and objects of this invention have already been listed above, others will be discussed as this description proceeds, when considered together with the accompanying drawings, in which.

DETAILED DESCRIPTION OF THE PREFERRED EMBODIMENTS

Figure 1:
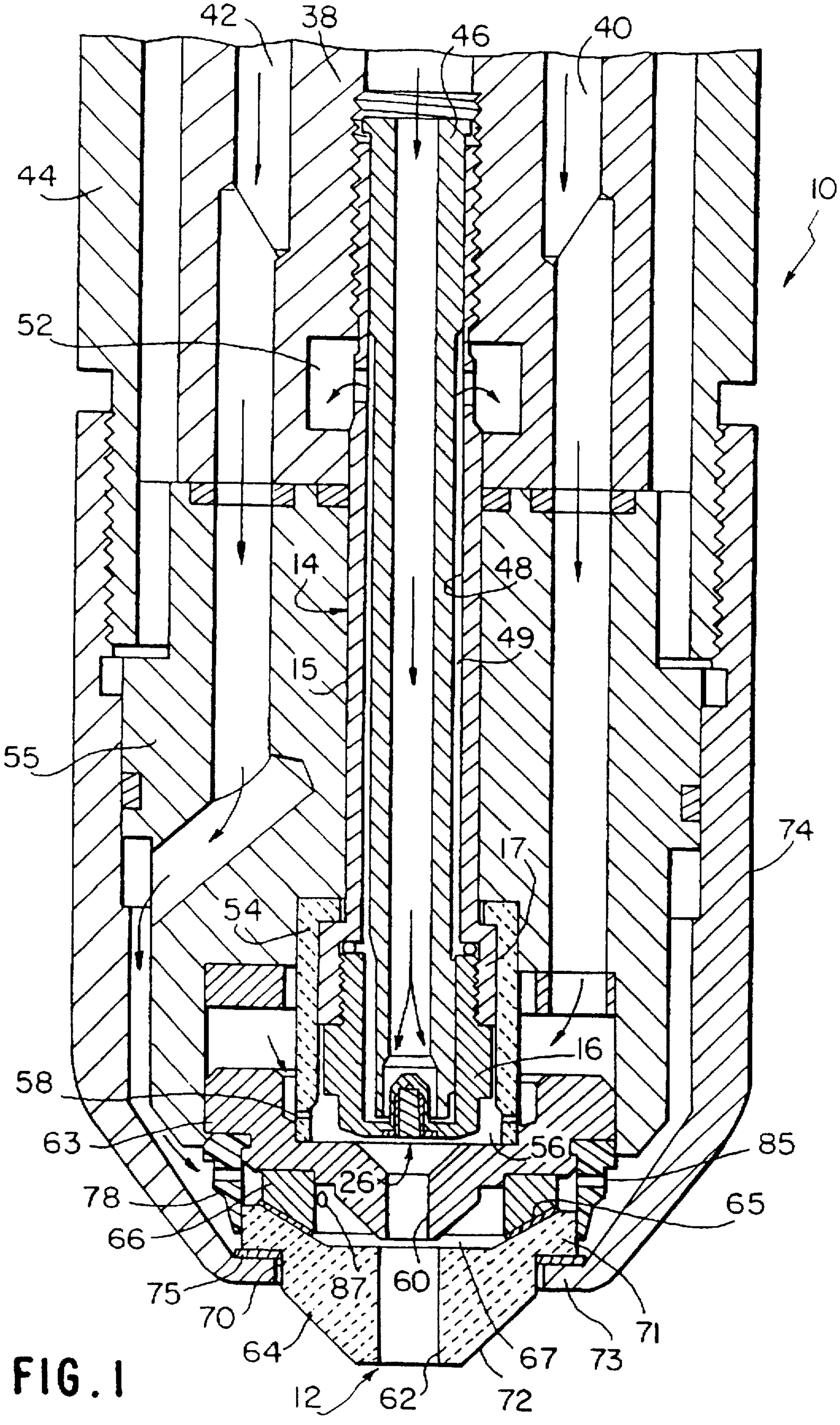
FIG. 1 is a sectional side elevation view of a plasma arc torch which embodies the features of the present invention.
Figure 2:
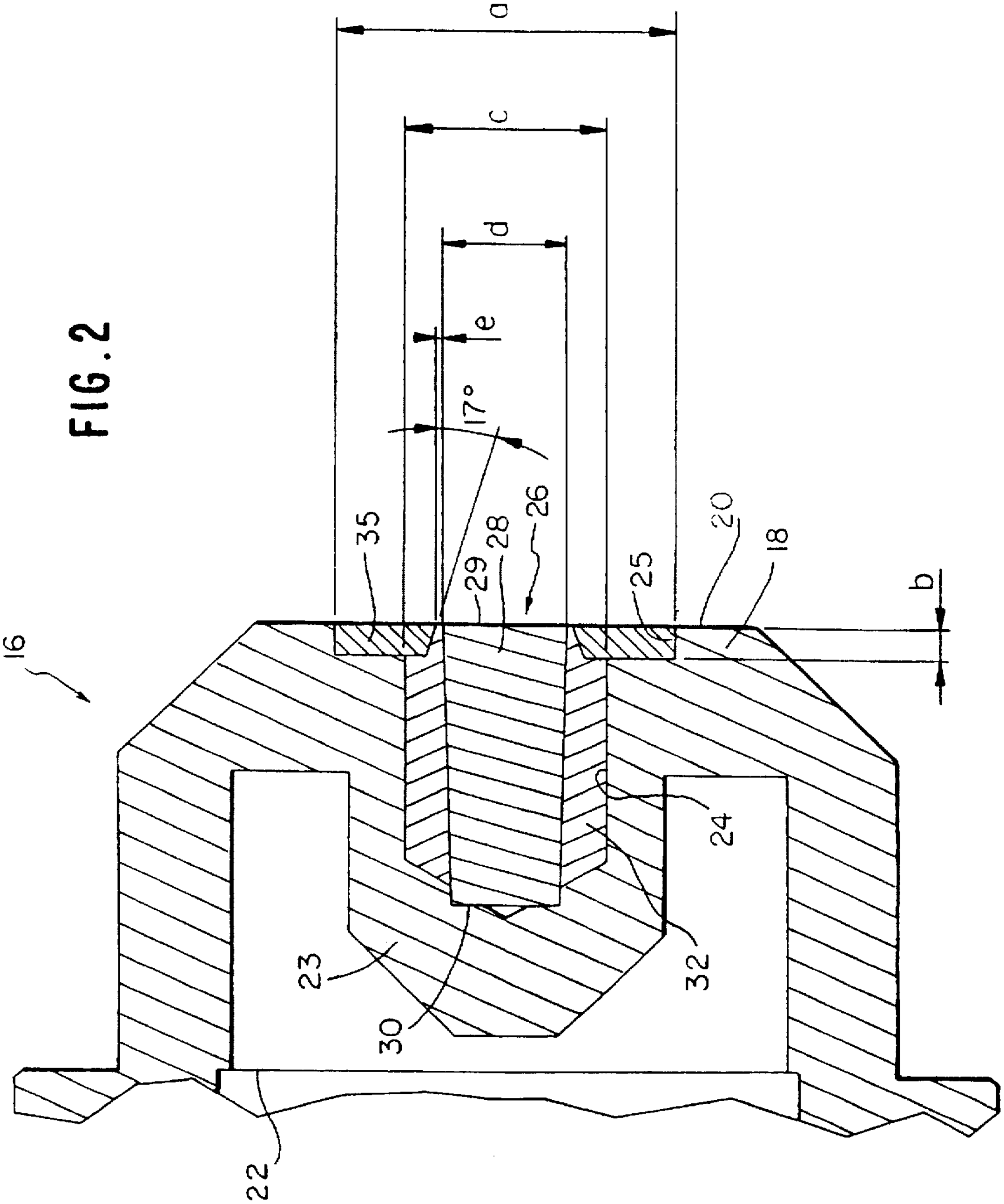
FIG. 2 is a fragmentary, sectional view of the electrode of the present invention and which is used in the plasma arc torch shown in FIG. 1.

In FIG. 1, a plasma arc torch 10 is shown which includes a nozzle assembly 12 and a tubular electrode 14. The electrode 14 is made preferably of copper or a copper alloy, and it is composed of an upper tubular member 15 and a lower, cup-shaped member or holder 16. More specifically, the upper tubular member 15 is of elongate open tubular construction and it defines the longitudinal axis of the torch. The upper tubular member 15 also includes an internally threaded lower end portion 17. The holder 16 is also of tubular construction, and it includes a lower front end and an upper rear end as seen in FIGS. 1 and 2. A transverse end wall 18 (see FIG. 2) closes the front end of the holder 16, and the transverse end wall 18 defines an outer front face 20. The rear end of the holder 16 is externally threaded and is threadedly joined to the lower end portion 17 of the upper tubular member 15 (see FIG. 1).

The holder 16 is open at the rear end thereof and so that the holder 16 has a cup-shaped configuration and defines an internal cavity 22 (FIG. 2). Also, the front end wall 18 of the holder includes a cylindrical post 23 which extends rearwardly into the internal cavity 22 and along the longitudinal axis. In addition, a cavity 24 is formed in the front face 20 of the end wall 18 and which extends rearwardly along the longitudinal axis and into a portion of the length of the post 23. The cavity 24 is generally cylindrical and it includes an enlarged or counter bored annular outer end portion 25.

An insert assembly 26 is mounted in the cavity 24 and comprises a generally cylindrical emissive insert 28 which is deposited coaxially along the longitudinal axis and which has a circular outer end face 29 lying in the plane of the front face 20 of the holder 16. The insert 28 also includes a circular inner end face 30 which is disposed in the cavity 24 and which is opposite the outer end face 29. The insert 28 is slightly tapered toward the inner end face 30 as best seen in FIG. 2. Further, the emissive insert 28 is composed of a metallic material which has a relatively low work function, in a range between about 2.7 to 4.2 ev, and so that it is adapted to readily emit electrons upon an electrical potential being applied thereto. Suitable examples of such materials are hafnium, zirconium, tungsten and alloys thereof.

A relatively non-emissive sleeve 32 is positioned in the cavity 24 coaxially about the emissive insert 28, with the sleeve 32 having a peripheral wall which is metallurgically bonded to the walls of the cavity. The end of the sleeve 32 nearest to the front end wall 18 of the holder 16 abruptly necks down and then gradually tapers toward the front face 20 of the holder 16 such that a thin annular surface having a distance between the inner diameter and outer diameter of between 0.004 inches and 0.005 inches surrounds the inner emissive insert 28 at the front face 20. The tapered portion at the end of the sleeve 32 tapers at approximately 170° with respect to a straight line extending perpendicular with respect to the front face 20 and aligned with the interface between the sleeve 32 and emissive insert 28, as shown in FIG. 2.

The sleeve 32 is composed of a metallic material having a work function which greater than that of the material of the holder 16, and also greater than that of the material of the emissive insert 28. In this regard, it is preferred that the sleeve be composed of a metallic material having a work function of at least about 4.3 ev. Several metals and alloys are suitable for the non-emissive sleeve 32 of the present invention. Such metals include silver, gold, platinum, rhodium, iridium, palladium, nickel, and alloys thereof. A summary of some of the properties of the above-noted materials are indicated in U.S. Pat. No. 5,023,425 which was previously incorporated by reference.

Figure 3:
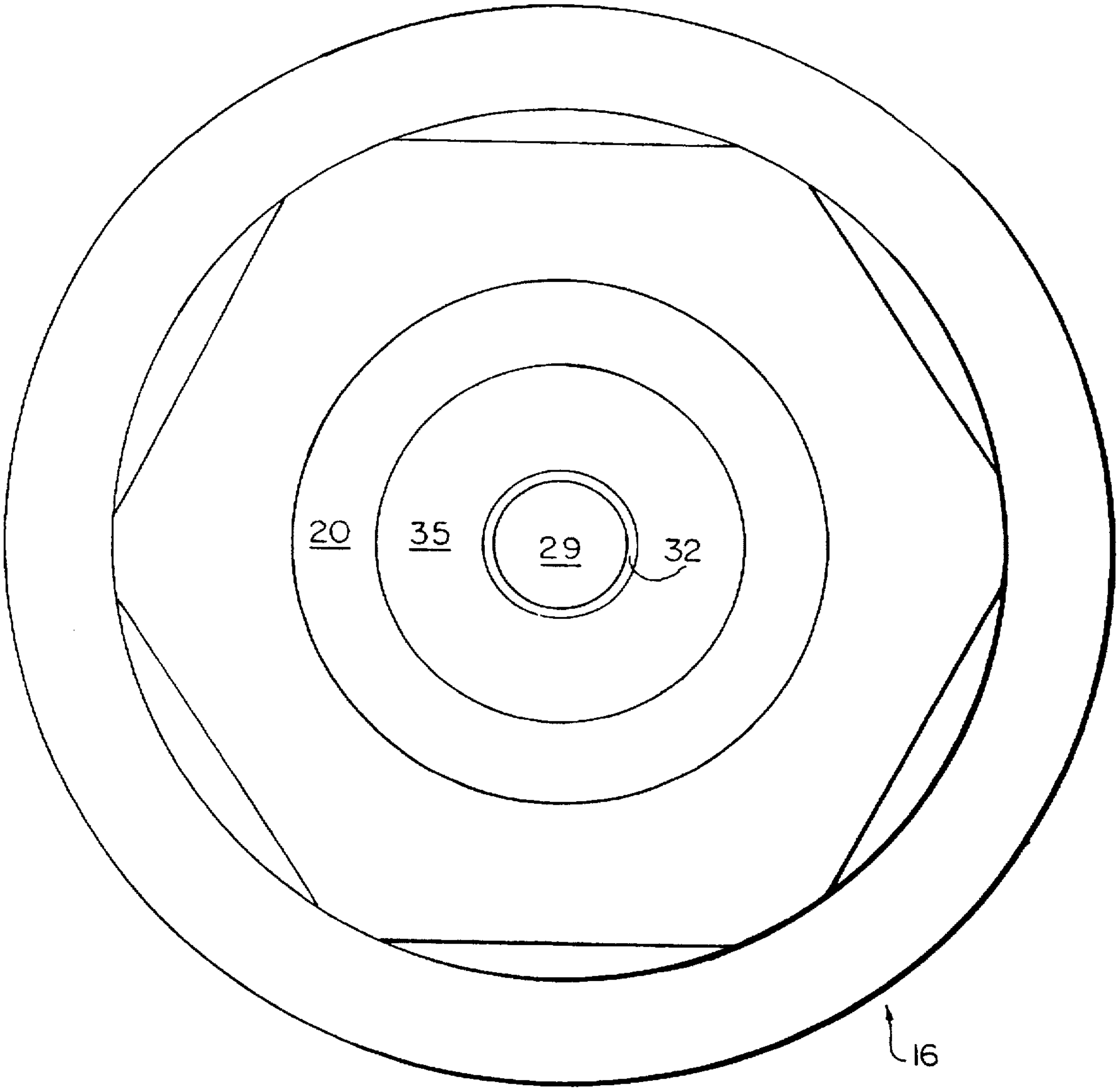
FIG. 3 is an end view of the electrode shown in FIG. 2.

The insert assembly 26 further includes an annular disc 35 which fits into the counter bored annular outer end portion 25 of the holder 16 and which surrounds the necked-down and tapered end portion of the sleeve 32. The annular disc 35 is formed of aluminum and thereby forms an aluminum face plate which is exposed at the front face 20 of the holder 16. Accordingly, as best shown in FIG. 3, the annular aluminum face plate or disc 35 surrounds the thin, annular, tapered end portion of the silver sleeve 32, which in turn surrounds the inner emissive insert 28 which is formed of, for example, hafnium, zirconium, tungsten, and alloys thereof, as noted above.

The aluminum face plate or disc 35 preferably, but not necessarily, has an outer diameter a of 0.250 inches and a thickness or depth b of 0.020 inches. The sleeve 32 preferably, but not necessarily, has an outer diameter c of 0.128 inches. The circular outer end face 29 of the emissive insert 28 preferably, but not necessarily, has a diameter d of 0.077 inches. As noted above, the thickness e of the thin annular end portion of the sleeve 32 which is exposed at the front face 20 of the holder 16 is on the order of 0.004 inches to 0.005 inches. Of course, these dimensions are given by way of example and are not intended to limit the present invention.

Accordingly, the electrode according to the present invention provides a significantly improved service life. More specifically, the silver (and other suitable metals described in detail above) sleeve 32 gives good conductivity and provides: a cooler flow of electricity to the emissive insert 28 (formed of, for example, hafnium); better heat flow out of the emissive insert 28 through the sleeve 32; and the emissive insert 28 is able to last longer since it can be maintained at a cooler temperature. Furthermore, the aluminum face plate or disk 35 serves to protect the arc from eroding away the silver sleeve 32 and thereby lose the benefits of having the silver sleeve surround the emissive insert.

The following Table 1 demonstrates the criticality of the present invention by comparing a number of different electrode configurations. All of the electrodes tested included an emissive insert formed of hafnium. Accordingly, for example, the very first test which is described as utilizing "Copper only" of course refers to the copper holder surrounding a hafnium emissive insert, whereas "Copper holder and silver sleeve" refers to the hafnium emissive insert being surrounded by a silver sleeve which in turn is surrounded by the copper holder. Further, the "Copper holder, silver sleeve with aluminum disc" of course refers to the configuration according to one embodiment of the present invention. Piercings of the metal were conducted until the electrode failed or was considered worn out by the operator.

TABLE 1

| Test Number | Description of Electrode | Amount of Pierces |
|---|---|---|
| 1 | Copper only | 139 |
| 1 | Copper only | 70 |
| 1 | Copper holder and silver sleeve | 180 |
| 1 | Copper holder and silver sleeve | 240 |
| 1 | Copper holder, silver sleeve with aluminum disc | 334 |
| 1 | Copper holder, silver sleeve with aluminum disc | 280 |
| 2 | Copper holder and aluminum disc | 114 |
| 2 | Copper holder and aluminum disc | 143 |
| 2 | Copper holder and silver sleeve | 184 |
| 2 | Copper holder and silver sleeve | 216 |
| 2 | Copper holder, silver sleeve with aluminum disc | 367 |
| 2 | Copper holder, silver sleeve with aluminum disc | 313 |

Based on the above results of the piercing tests, it is apparent that the electrode configuration according to the present invention has a substantially longer operating life than the conventional electrode assembly.

The remaining plasma arc torch structure is conventional and is disclosed in the '425 patent mentioned above. More specifically, the electrode 14 is mounted in a plasma arc torch body 38, which has gas and liquid passageways 40 and 42, respectively. The torch body 38 is surrounded by an outer insulated housing member 44.

The tube 46 is suspended within the central bore 48 of the electrode 14 for circulating a liquid medium such as water through the electrode structure 14. The tube 46 is of a diameter smaller than the diameter of the bore 48 so as to provide a space 49 for the water to flow upon discharge from the tube 46. The water flows from an unshown source through the tube 46, along the post 23, and back through the space 49 to the opening 52 in the torch body 38 and to an unshown drain hose. The passageway 42 directs the injection water into the nozzle assembly 12 where it is converted into a swirling vortex for surrounding the plasma arc. The gas passageway 40 directs gas from a suitable source, through a conventional gas baffle 54 of any suitable high temperature ceramic material into a gas plenum chamber 56 via inlet hole 58. The inlet holes 58 are arranged so as to cause the gas to enter the plenum chamber 56 in a swirling fashion as is well known. The gas flows from the plenum chamber 56 through the arc constricting coaxial bores 60 and 62 of the nozzle assembly 12. The electrode 14 upon being connected to the torch body 38 holds in place the ceramic gas baffle 54 and a high temperature plastic insulating member 55. The member 55 electrically insulates the nozzle assembly 12 from the electrode 14.

The nozzle assembly 12 comprises an upper nozzle member 63 and a lower nozzle member 64, with the members 63 and 64 including the first and second bores 60, 62, respectively. Although the upper and lower nozzle members may both be metal, a ceramic material such as alumina is preferred for the lower nozzle member.

The lower nozzle member 64 is separated from the upper nozzle member 63 by a plastic spacer element 65 and a water swirl ring 66. The space provided between the upper nozzle member 63 and the lower nozzle member 64 forms a water chamber 67. The bore 60 of the upper nozzle member 63 is in axial alignment with the longitudinal axis of the torch electrode 14. Also, the bore 60 is cylindrical, and it has a chamfered upper end adjacent the plenum chamber 56, with a chamfer angle of about 45°.

The lower nozzle member 64 comprises a cylindrical body portion 70 which defines a forward (or lower) end portion and a rearward (or upper) end portion, and with the bore 62 extending coaxially through the body portion. An annular mounting flange 71 is positioned on the rearward end portion, and a frusto-conical surface 72 is formed on the exterior of the forward end portion so as to be coaxial with the second bore 62. The annular flange 71 is supported from below by an inwardly directed flange 73 at the lower end of the cup 74, with the cup 74 being detachably mounted by interconnecting threads to the outer housing member 44. Also, a gasket 75 is disposed between the two flanges 71 and 73.

The arc constricting bore 62 in the lower nozzle member 64 is cylindrical, and it is maintained in axial alignment with the arc constricting bore 60 in the upper member 63 by a centering sleeve 78 of any suitable plastic material. The centering sleeve 78 has a lip at the upper end thereof which is detachably locked into an annular notch in the upper nozzle member 63. The centering sleeve 78 extends from the upper nozzle in biased engagement against the lower member 64. The swirl ring 66 and spacer element 65 are assembled prior to insertion of the lower member 64 into the sleeve 78. The water flows from the passageway 42 through openings 85 in the sleeve 78 to the injection ports 87 of the swirl ring 66, and which inject the water into the water chamber 67. The injection ports 87 are tangentially disposed around the swirl ring 66, to cause the water to form a vortical pattern in the water chamber 67. The water exits the water chamber 67 through the arc constricting bore 62 in the lower nozzle member 64.

A power supply (not shown) is connected to the torch electrode 14 in a series circuit relationship with a metal workpiece which is typically grounded. In operation, the plasma arc is established between the emissive insert of the torch 10 which acts as the cathode terminal for the arc, and the workpiece which is connected to the anode of the power supply, and which is positioned below the lower nozzle member 64. The plasma arc is started in a conventional manner by momentarily establishing a pilot arc between the electrode 14 and the nozzle assembly 12 which is then transferred to the workpiece through the arc constricting bores 60 and 62, respectively. Each arc constricting bore 60 and 62 contributes to the intensification and collimation of the arc, and the swirling vortex of water envelopes the plasma as it passes through the lower passageway 62.

Figure 4:
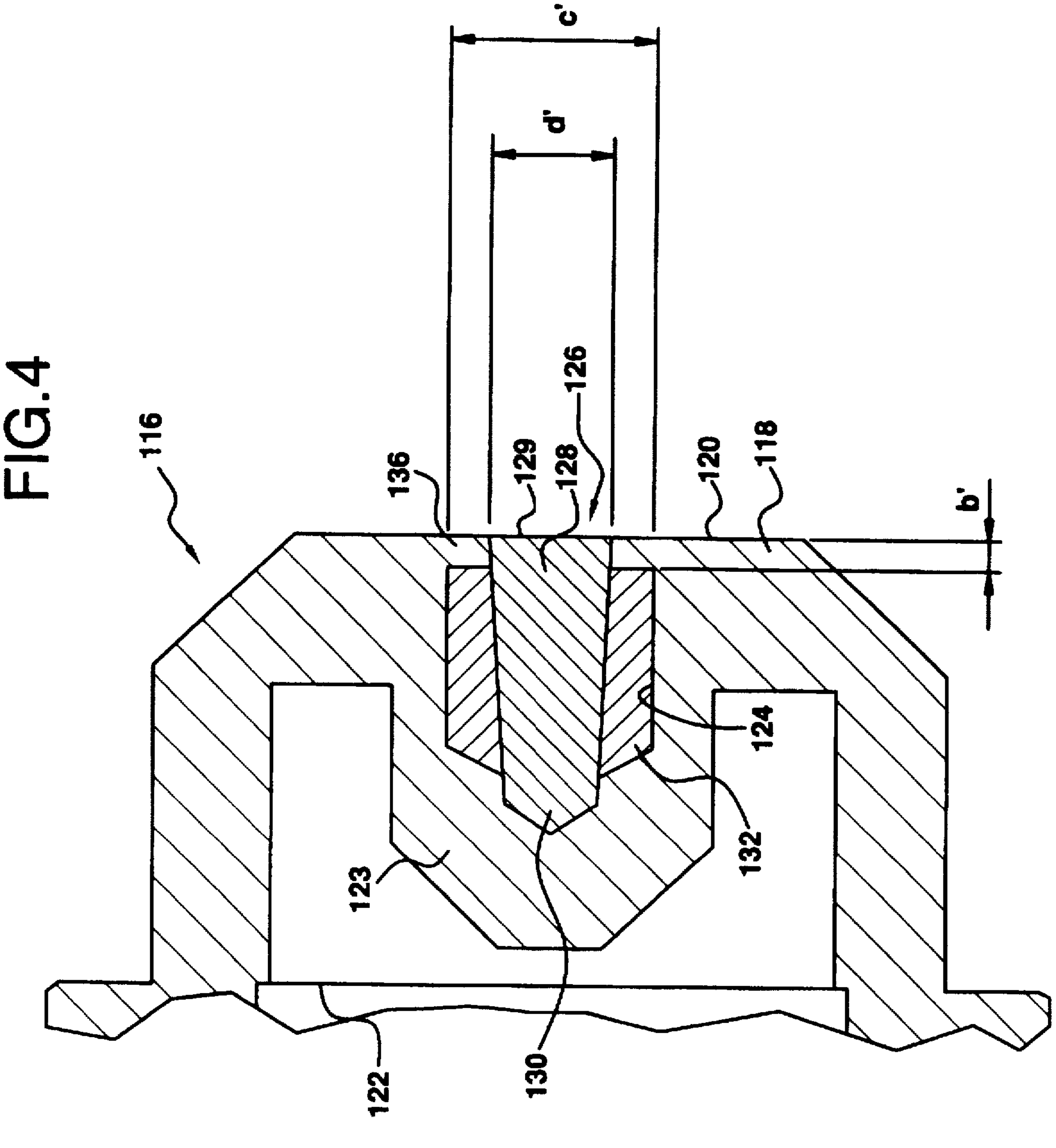
FIG. 4 is a fragmentary, sectional view of an alternative embodiment of the electrode according to the present invention and which is used in the plasma arc torch shown in FIG. 1.
Figure 5:
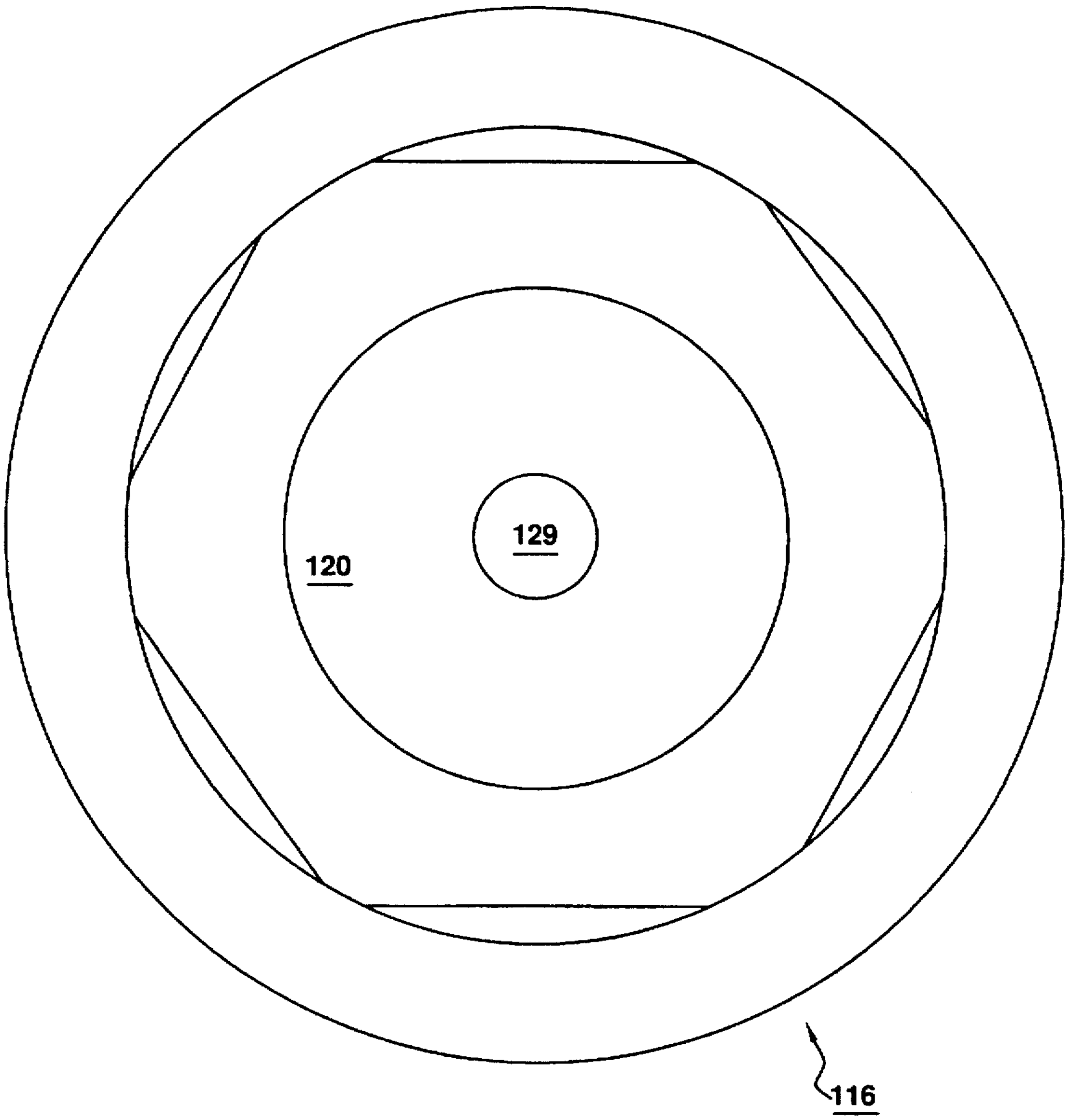
FIG. 5 is an end view of the alternative electrode shown in FIG. 4.

FIGS. 4 and 5 show an alternative embodiment of the electrode according to the present invention and which is used in the plasma arc torch shown in FIG. 1. Structural elements similar to those illustrated for the previous embodiment are designated by the same reference numerals but preceded by the numeral 1. In this alternative embodiment, the aluminum face plate 35 utilized in the previous embodiment is eliminated and the front end of the metallic holder 116 is instead extended over to contact directly the emissive insert 128. This overlay portion 136 of the metallic holder 116 between the front face 120 thereof and the sleeve 132 has a predetermined thickness, as will be discussed in more detailed below.

As best shown in FIG. 4, in the alternative embodiment, the cavity 124 is formed in the front face 120 of the front end wall 118 such that the cavity has varying diameters depending on the location along the depth of the cavity 124. The large diameter internal portion of the cavity 124 is intended to receive the relatively non-emissive sleeve 132 as will be discussed in more detail below. The bottom of the cavity 124 is configured so that the deepest portion of the cavity 124 is tapered to receive the emissive insert 128.

An insert assembly 126 is mounted in the cavity 124 and comprises a generally cylindrical emissive insert 128 which is deposited coaxially along the longitudinal axis and which has a circular outer end face 129 lying in the plane of the front face 120 of the holder 116. The insert 128 also includes an inner tapered end face 130 which is disposed in the cavity 124 and which is opposite the outer end face 129. The entire insert 128 is slightly tapered toward the inner tapered end face as best seen in FIG. 4. As in the previous embodiment, the emissive insert 128 is composed of a metallic material which has a relatively low work function such as hafnium, zirconium, tungsten and alloys thereof.

The relatively non-emissive sleeve 132 is positioned in the cavity 124 coaxially about a portion intermediate the two end portions of the emissive insert 128, with the sleeve 132 having a peripheral wall which is metallurgically bonded to the wall of the cavity. The end of the sleeve 132 nearest to the front end wall 118 of the holder 116 does not extend to the front face 120 as was the case in the previous embodiment. As in the previous embodiment, the sleeve 132 is composed of a metallic material having a work function which is greater than that of the material of the holder 116, and also greater than that of the material of the emissive insert 128. Suitable metals again include silver, gold, platinum, rhodium, iridium, palladium, nickel, and alloys thereof, as with the previous embodiment.

As noted above, the present alternative embodiment eliminates the annular aluminum disc or face plate 35 and corresponding counter bored portion 25 in the holder, and instead extends the metallic holder 116 as the overlay portion 136 so as to contact directly the emissive insert 128 so that no portion of the, for example, silver, sleeve 132 is exposed at the front face 120 of the holder 116. The thickness of the overlay portion 136 of the copper holder 116 between the front face 120 thereof and the silver sleeve 132 preferably, but not necessarily, has a thickness b' of 0.010 inches. The sleeve 132 preferably, but not necessarily, has an outer diameter c' of 0.130 inches. The circular outer end face 129 of the emissive insert 128 preferably, but not necessarily, has a diameter d' of 0.086 inches. Further, the axial length of the emissive insert 128 is preferably, but not necessarily, 0.203 inches, while the axial length of the silver sleeve is preferably, but not necessarily, 0.164 inches. Of course, these dimensions are given by way of example and are not intended to limit the present invention.

With the above-described structure of the present invention, the electrode according to the alternative embodiment of the present invention likewise provides a significantly improved service life. More specifically, the silver (and other suitable materials described in detail above) sleeve 132 provides good conductivity and provides: a cooler flow of electricity to the emissive insert 128 (formed of, for example, hafnium); better heat flow out of the emissive insert 128 through the sleeve 132; and the emissive insert 128 is able to last longer since it can be maintained at a cooler temperature. Furthermore, extending the copper holder 116 in the form of the overlay portion 136 at the front face 120 of the electrode so as to contact directly the emissive insert 128 provides for a poor electrical contact with the hafnium of the emissive insert 128. This in turn causes the arc to burn narrowly into the hafnium insert. Once the copper overlay portion 136 has been burned away, so that the upper portion of the silver sleeve 132 becomes exposed at the front face, the arc burn is already established so as to be very narrow, e.g., between 0.110 and 0.170 inches. In this regard, it is pointed out that the more narrow the arc burn, the longer the service life of the electrode.

Figure 6:
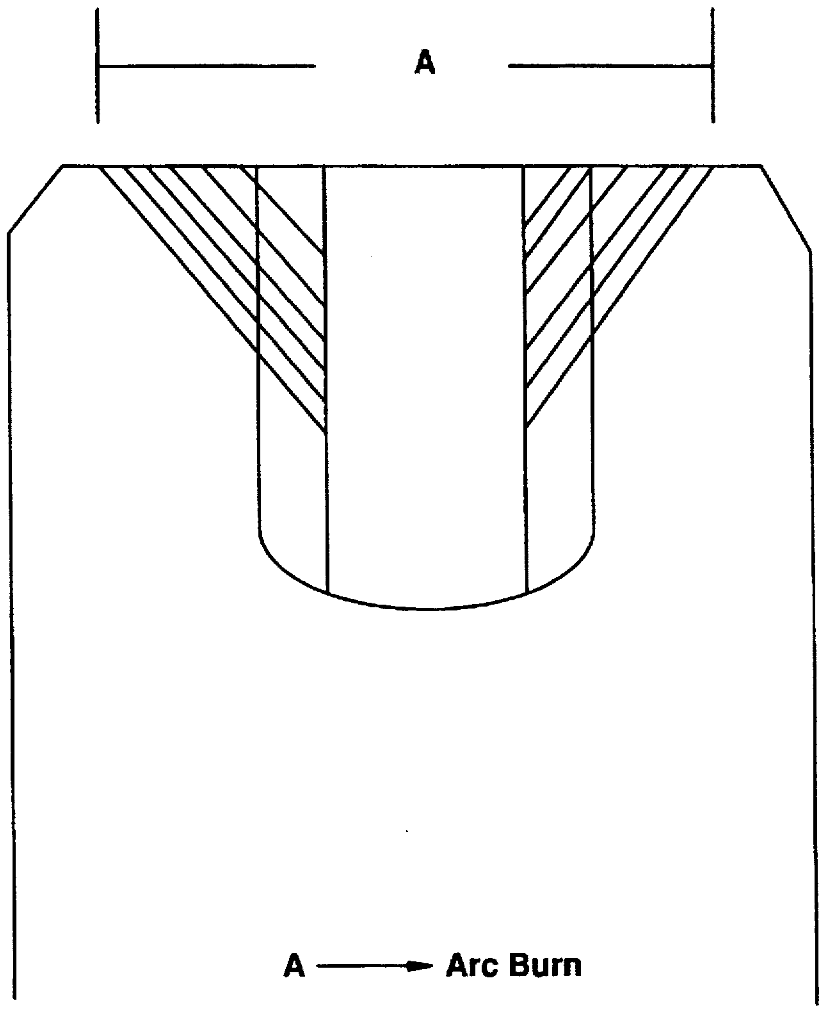
FIG. 6 is a schematic illustration for explaining the pattern of arc burn.

In contrast, as shown in the explanatory drawing of FIG. 6, with a conventional electrode where a silver sleeve surrounds the emissive insert and is exposed at the front face of the electrode, the arc burn is much wider and on the order of between 0.170 and 0.270 inches, thereby resulting in a reduced electrode life. In the schematic drawing of FIG. 6, "A" represents the arc burn of the conventional electrode where the silver sleeve is exposed at the front face of the copper holder.

The following supplemental Table 2 shows the further advantages of the alternative embodiment of the present invention. The electrode tested included an emissive insert formed of hafnium. The "copper holder and silver sleeve having a copper overlay" of course refers to the configuration according to the alternative embodiment of the present invention.

Again, piercings of the metal were conducted until the electrode failed or was considered worn out by the operator.

TABLE 2

| Test Number | Description of Electrode | Amount of Pierces |
|---|---|---|
| 3 | Copper holder and silver sleeve having copper overlay | 602 |
| 3 | Copper holder and silver sleeve having copper overlay | 525 |
| 3 | Copper holder and silver sleeve having copper overlay | 528 |

Again, based on the above results of the piercing test, it is apparent that the electrode configuration according to the alternative embodiment of the present invention has a substantially longer operating life than the conventional electrode assembly (refer to Table 1).

It is contemplated that numerous modifications may be made to the electrode for plasma arc torch of the present invention without departing from the spirit and scope of the invention as defined in the following claims.

What is claimed is:

1. An electrode for supporting an arc in a plasma arc torch, said electrode comprising:

a metallic holder having a front end, and a cavity in said front end; and an insert assembly mounted in said cavity and comprising an emissive insert composed of a metallic material having a relatively low work function, a sleeve which surrounds at least a portion of said emissive insert so as to separate said portion of said emissive insert from contact with said holder, said sleeve being composed of a metal which is selected from the group consisting of silver, gold, platinum, rhodium, iridium, palladium, nickel, and alloys thereof, wherein said metallic holder includes an overlay portion at said front end, said overlay portion directly contacting said emissive insert so that none of said sleeve is exposed at said front end.

2. The electrode as claimed in claim 1, wherein said metallic holder comprises a metal selected from the group consisting of copper and copper alloys.

3. The electrode as claimed in claim 1, wherein said emissive insert comprises a metal selected from the group consisting of hafnium, zirconium, tungsten, and alloys thereof.

4. The electrode as claimed in claim 1, wherein said overlay portion of said metallic holder has a thickness of about 0.010 inches.

5. The electrode as claimed in claim 1, wherein said holder is generally tubular and has a transverse end wall which defines an outer front face, and wherein said emissive insert has an outer end face which lies in the plane of said outer front face of said metallic holder.

* * * * *